(12) United States Patent
Goldstein et al.

(10) Patent No.: US 6,355,886 B1
(45) Date of Patent: Mar. 12, 2002

(54) UNDERSEA TRUNK-AND-BRANCH LOGICAL RING NETWORKS

(75) Inventors: Evan Lee Goldstein, Princeton; Patrick R. Trischitta, Holmdel, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/353,296

(22) Filed: May 21, 1999

(51) Int. Cl.[7] .................................................. G02B 6/28
(52) U.S. Cl. ........................................ 174/70 S; 385/24
(58) Field of Search ............................ 174/70 S, 71 R, 174/72 R; 385/14, 15, 16, 24

(56) References Cited

U.S. PATENT DOCUMENTS

| | | | |
|---|---|---|---|
| 5,179,548 A | | 1/1993 | Sandesara .................. 370/16.1 |
| 5,327,427 A | | 7/1994 | Sandesara ................ 370/85.14 |
| 5,717,796 A | * | 2/1998 | Clendening .................. 385/24 |
| 5,737,310 A | * | 4/1998 | Goto .......................... 370/222 |
| 5,854,698 A | * | 12/1998 | Eskildsen et al. ............ 359/119 |
| 6,006,330 A | * | 12/1999 | Soni ............................ 713/201 |
| 6,035,340 A | * | 3/2000 | Fischer et al. .............. 709/249 |
| 6,052,210 A | * | 4/2000 | Nathan ........................ 359/119 |
| 6,061,335 A | * | 5/2000 | De Vito et al. ............. 370/258 |
| 6,088,141 A | * | 7/2000 | Merli et al. ................. 359/110 |
| 6,122,418 A | * | 9/2000 | Ellis ............................. 385/27 |
| 6,222,951 B1 | * | 4/2001 | Huang ......................... 385/14 |
| 6,259,850 B1 | * | 7/2001 | Crosby et al. .............. 385/134 |
| 6,295,397 B1 | * | 9/2001 | Augustsson .................. 385/24 |
| 6,317,529 B1 | * | 11/2001 | Kashima ..................... 359/128 |

* cited by examiner

Primary Examiner—Dean A. Reichard
Assistant Examiner—Adolfo Nino

(57) ABSTRACT

A trunk and branch logical ring network includes a plurality of nodes that are coupled to a ring backbone by a plurality of branching units. The connections to the ring backbone are such that physically adjacent nodes are not adjacent to one another logically in the network. By providing this alternating branching arrangement the maximum length of any unregenerated span along the ring is significantly reduced. This reduces repeater spacing in the network.

13 Claims, 2 Drawing Sheets

UNDERSEA TRUNK-AND-BRANCH LOGICAL RING NETWORKS

BACKGROUND OF THE INVENTION

The present invention is directed to a trunk-and-branch logical ring network. In particular, the present invention provides an arrangement by which network nodes that are physically adjacent to one another in a network are coupled in a logical ring configuration.

Robustness of networks is a key consideration in the design of a network. However, the costs associated with providing robustness must be factored into the decision making process. In the undersea environment one approach to improving robustness suggests to combine a trunk-and-branch configuration, which is known, with the characteristics of a ring architecture. However, full physical rings have a significant vice in that they are cable intensive and are therefore expensive.

SUMMARY OF THE INVENTION

The present invention is directed to a network configuration which incorporates the features of a trunk-and-branch architecture and a logical ring while reducing architecture costs.

In accordance with an embodiment of the present invention, rather than provide one uninterrupted trunk segment to provide connection between some of the network nodes half of the ring, thereby necessitating substantial additional equipment such as repeaters, the architecture in accordance with the present invention incorporates branching units which are disposed along the trunk so as to reduce the maximum cable length of the trunk. The branching units connect the respective nodes onto a logical ring so that logically adjacent nodes for communication purposes are physically non-adjacent in the ring.

DETAILED DESCRIPTION

Figure 1:
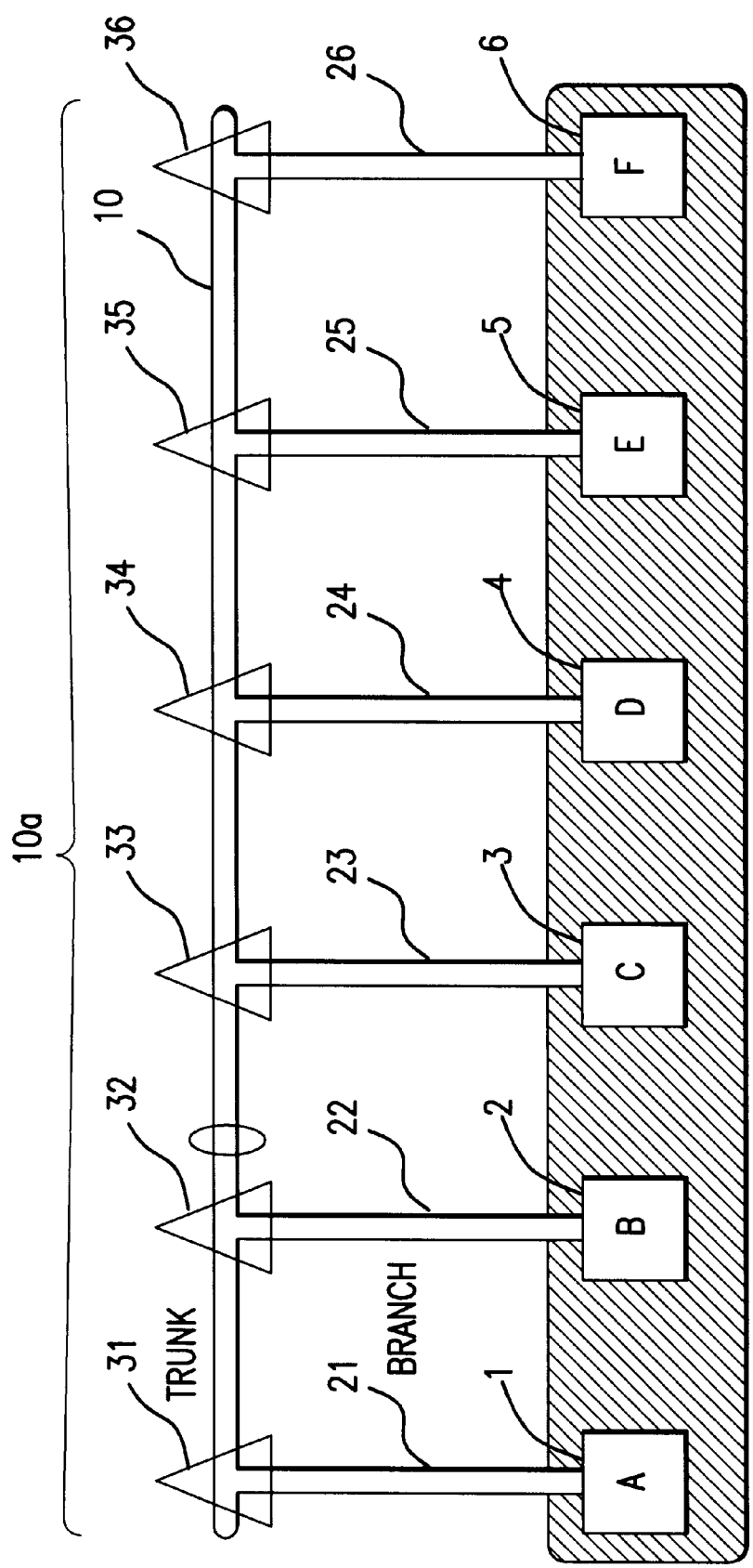
FIG. 1 illustrates an embodiment of a trunk-and-branch logical ring network.

FIG. 1 illustrates a basic trunk-and-branch logical ring network as implemented in an undersea network. In this example there are six cable stations or nodes 1 to 6. Each of these nodes is on land. A ring backbone 10 is placed in deep water so as to reduce the effects of cable cuts along the trunk. Each of the nodes is coupled to a branch 21 to 26 which is disposed between the ring backbone and the nodes and traverses, for example, shallow water. A branching unit 31 to 36, couples an associated branch with the ring backbone 10. In this configuration the network's ring backbone is contained in a single cable. In building such a network one is hoping to extract the ring-virtue of fast, standardized restoration, and thus increase system availability. One is also seeking the trunk-and-branch virtue of reduced exposure to cable cuts and thus reduced probability of needing repair by ship. By avoiding a full physical ring, one reduces the total kilometers of cable necessary and thus associated costs. However, as can be seen upon review of the ring backbone 10, there is at least one segment of the ring 10a which is of exceptional length. This constitutes a long unregenerated transmission path that runs from one physical end of the network to the other. It is this long unregenerated span that will control repeater spacing.

This can be a significant problem since the number of repeaters necessary along a given unregenerated span is not linearly related to the length of the span. Instead, if the unregenerated span is doubled, the number of repeaters required may be significantly more than twice the number of repeaters needed for the original span. It is therefore desirable to reduce the maximum unregenerated span to the greatest extent possible and thereby reduce not only the number of repeaters as a gross total but also to increase the repeater distancing.

Figure 2:
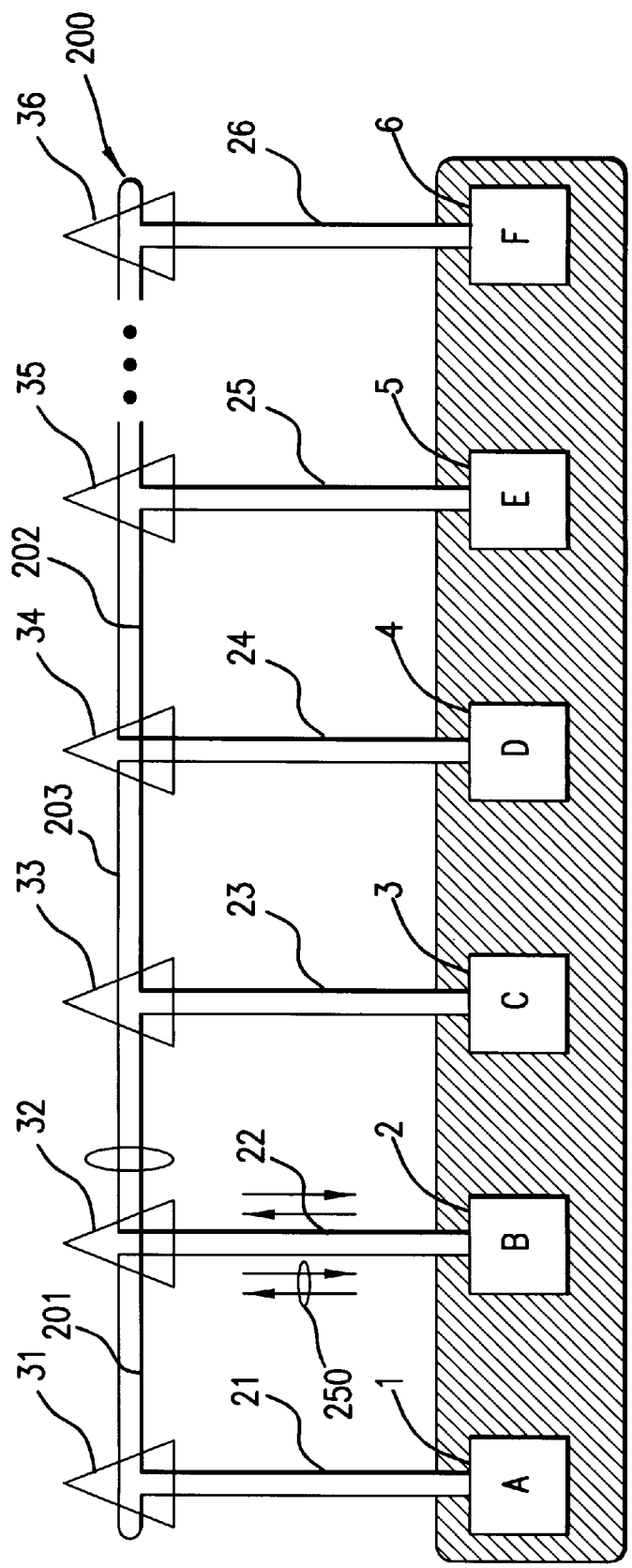
FIG. 2 illustrates an embodiment of the present invention as implemented in a trunk-and-branch logical ring network.

An embodiment of the present invention is shown as a modification to the trunk-and-branch logical ring of FIG. 1 and is illustrated in FIG. 2. As in the first configuration there are six nodes shown (1 to 6). The invention, however, is not limited to this number of nodes. Instead, it is applicable wherever a loop configuration would otherwise yield exceptionally long unregenerated spans due to the physical locations of the stations. Again, each node is connected via a branch segment (21 to 26) that is disposed in shallow water to a ring backbone 200 that is disposed in deep water using branching units 31 to 36. However, as can be seen by comparison of these two drawing figures (FIG. 1 and FIG. 2), the branching connections to the loop in FIG. 2 have been changed. More specifically, in accordance with the arrangement illustrated in FIG. 2 alternate branching connections are provided to the loop. As a consequence, the loop 200 can be thought of as being constituted by a plurality of portions of similar length. For instance, a first segment 201 extends from node A to node C. A second segment 202 extends from node C to node E. Another segment 203 extends from node B to node D.

In accordance with this arrangement the maximum unregenerated span for the ring backbone is no greater than 2 hops, that is the physical distance to travel between a first of the nodes and a node twice removed from that node physically along the network, for example, the distance between node B and node D.

This arrangement creates a situation where two physically adjacent nodes, for example, B and C, are not physically adjacent to one another in the network, but are logically adjacent for communication purposes.

If one were to consider the order of the physical network starting from node A it would extend from node A to node B then to node C, then to node D, then to node E, then to node F. In the loop configuration of FIG. 1, the loop order corresponds to the physical order of the nodes in the network: node B followed node A, node C followed node B, node D followed node C, node E followed node D, and node F followed node E. In FIG. 1 node F then looped back to node A. However, in FIG. 2 the logical ring order is distinct from the physical order of the nodes. With the alternating branch connection as shown in FIG. 2, the logical ring order beginning with node A is as follows: node A is followed by node C; which is followed by node E; which is followed by node F; which is followed by node D; which is followed by node B; which is followed by node A. Thus, the physically adjacent nodes are not always logically adjacent and the logically adjacent nodes are not always physically adjacent to one another.

By arranging the branch connection to the ring backbone in this manner the maximum unregenerated span is dramatically reduced and thereby significantly reduces the requirement for repeaters.

In the embodiment of the invention described above, each line, for example 250, constitutes an optical fiber pair with each optical fiber pair being constituted by two uni-directional optical fibers providing transmission in opposite directions as shown by the two pairs of opposite pointing arrows associated with the branch 22 that couples node B (2) to the ring backbone.

By alternating the branch connections in the manner described above, one can reduce the maximum unregenerated span from approximately $(N-1) \times L_T + 2 L_B$ to approximately $2 L_T + 2 L_B$ where $L_T$ is the trunk length segment length between terminals (or nodes) and $L_B$ is the branch segment length. Thus, the maximum unregenerated span can be significantly reduced, thereby increasing repeater spacing.

This application is not limited to undersea environments. It is applicable in other transmission environments where it is desirable to provide a robustness for the network while at the same time being aware of and reducing the occurrence of significantly long spans where signals are not regenerated, thereby avoiding the need for costly equipment to maintain transmission capabilities.

What is claimed is:

1. An optical communication system having a trunk and branch topology comprising:
   a plurality of cable stations;
   a cable trunk having at least one optical fiber therein configured to propagate optical signals;
   a plurality of branching units disposed along said cable trunk and;
   a plurality of branches, each branch coupling one of said plurality of cable stations to said cable trunk via one of said branching units;
   wherein at least one of said cable stations is physically between and adjacent to two neighboring cable stations and is logically non-adjacent to said two neighboring stations along said cable trunk.

2. The optical communication system in accordance with claim 1, wherein said cable trunk includes at least an optical fiber pair with each of said fibers providing uni-directional transmission in opposite directions.

3. The optical communication system in accordance with claim 1, wherein each of said branches includes at least an optical fiber pair with each of said fibers providing uni-directional transmission in opposite directions.

4. A trunk-and-branch logical ring network comprising:
   a plurality of cable stations;
   a logical ring backbone having a physical trunk-and-branch topology;
   a plurality of branching units coupled to said ring backbone; and
   a plurality of branches, each branch coupling one of said plurality of cable stations to said ring backbone via one of said branching units;
   wherein a first cable station is coupled to a first logical position along the ring backbone, a second cable station physically non-adjacent to said first cable station in the network is coupled to a second logical position, adjacent to said first logical position and a third cable station physically between and adjacent to said first and second cable stations is coupled to a third logical position, said third logical position being logically adjacent to said first logical position and logically non-adjacent to said second logical position.

5. A communication network having a trunk and branch configuration, said network comprising:
   a plurality of cable stations, $CS_1 \ldots CS_N$ disposed adjacently from 1 to N within said network;
   a plurality of optical cable spans, a first of said plurality of spans optically coupling a first cable station $CS_i$ directly with a third cable station $CS_{i+2}$; and
   a second of said plurality of optical cable spans optically coupling said second cable station $CS_{i+1}$ directly with a fourth cable station $CS_{i+3}$.

6. The communication network in accordance with claim 5 further comprising a third of said plurality of spans optically coupling said first cable station $CS_i$ directly with said second cable station $CS_{i+1}$.

7. The communication network in accordance with claim 5 further comprising:
   a plurality of branching units connected to each of said cable spans, each of said branching units configured to direct optical signals between each of said cable stations.

8. The communication network in accordance with claim 7 further comprising a plurality of branch segments defined by a portion of each of said cable spans from each of said plurality of branching units to each of said cable stations.

9. The communication network in accordance with claim 5 further comprising a plurality of optical repeaters disposed along each of said spans.

10. The communication network in accordance with claim 5 wherein each of said spans includes at least an optical fiber pair with each of said fibers providing uni-directional transmission in opposite directions.

11. The communication network in accordance with claim 10 wherein the maximum number of said repeaters within any of said plurality of spans corresponds to the longest of said plurality of spans.

12. The communication network in accordance with claim 10 further comprising a plurality of optical repeaters disposed along each of said spans and said branch segments.

13. The communication network in accordance with claim 12 wherein the number of said optical repeaters is reduced from an approximately $(N-1) \times L_T + L_B$ to approximately $2L_T + 2L_B$ where $L_T$ is the span length and $L_B$ is the branch length.

* * * * *

UNITED STATES PATENT AND TRADEMARK OFFICE
CERTIFICATE OF CORRECTION

PATENT NO. : 6,355,886 B1
DATED : March 12, 2002
INVENTOR(S) : Evan Lee Goldstein and Patrick R. Trischitta It is certified that error appears in the above-identified patent and that said Letters Patent is hereby corrected as shown below:

<u>Title page,</u>
Item [57], ABSTRACT,
Last line, please delete the words "repeater spacing" and replace with
-- the number of repeaters needed --.

Signed and Sealed this

Fourth Day of June, 2002

*Attest:*

*Attesting Officer*

JAMES E. ROGAN
*Director of the United States Patent and Trademark Office*